Nov. 12, 1935.    R. S. NELSON ET AL    2,020,654
CONTINUOUS ABSORPTION REFRIGERATING SYSTEM
Filed Oct. 16, 1933
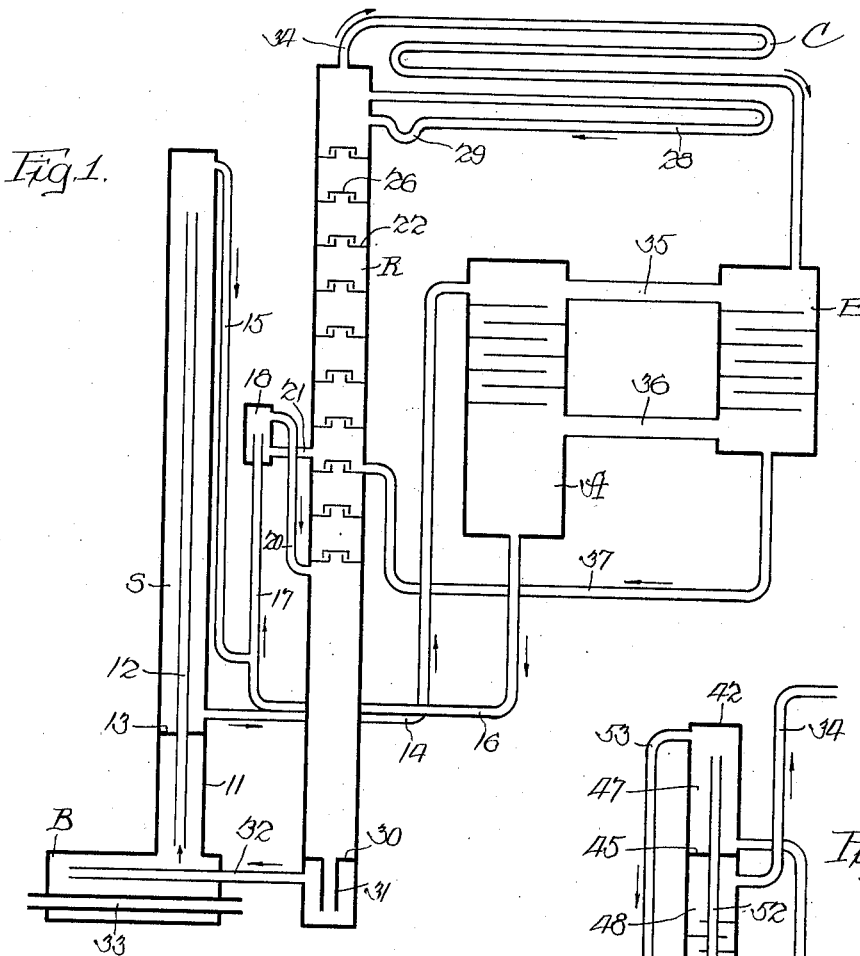
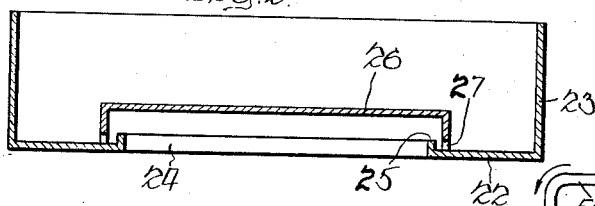
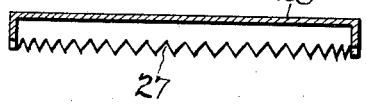
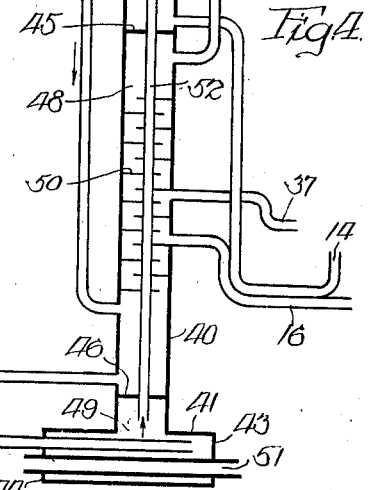
Inventors:
Rudolph S. Nelson
Walter C. Davidson
By Harry S. Demarse
Atty.

Patented Nov. 12, 1935

2,020,654

UNITED STATES PATENT OFFICE 2,020,654

CONTINUOUS ABSORPTION REFRIGERATING SYSTEM

Rudolph S. Nelson, Rockford, Ill., and Walter C. Davidson, North Canton, Ohio, assignors to The Hoover Company, North Canton, Ohio, a corporation of Ohio Application October 16, 1933, Serial No. 693,696

9 Claims. (Cl. 62—119.5)

This invention relates to continuous absorption refrigerating systems, and more particularly to the boiler thereof and to the means associated with the boiler which aid it in separating the refrigerant from the absorption liquid used in the refrigerating system.

This application is a continuation in part of the co-pending application of R. S. Nelson, Serial No. 539,450 filed May 23, 1931 for Absorption refrigeration.

In continuous absorption refrigerating apparatus the capacity and efficiency of operation depend to a large extent upon the completeness of the separation of the refrigerant from the absorption liquid on the boiler side of the system. This is particularly so if a weak absorption solution is employed in order to improve the operation in the absorber.

It is an object of the present invention to provide means and methods for effectively separating a refrigerant from the absorption liquid in a continuously operating absorption refrigerating system.

A further object of the invention is to provide a boiler for separating refrigerants from absorption solutions and in which the absorption solution is continuously circulated to prevent the solution from stratifying into layers of different concentration.

Other objects and advantages reside in certain novel features of the arrangement and construction of parts as will be apparent from the following description taken in connection with the accompanying drawing in which:

Figure 1 is a diagram of a complete absorption refrigerating system showing one form of the invention incorporated therein.

Figure 2 is a cross-sectional view of a set of trays adapted to be used in the analyzer-rectifier of the arrangement of Figure 1.

Figure 3 is a cross-sectional view of one of the caps which are used in the analyzer-rectifier of Figure 1, and Figure 4 is a diagrammatic representation of a boiler-analyzer-rectifier assembly which may be used instead of the similar assembly of Figure 1, Figure 4 being a modified form of the invention.

Referring to the drawing in detail and particularly to Figure 1, a continuous absorption refrigerating system is shown as consisting of a boiler B, a gas separation chamber S, a standpipe R in which is incorporated an analyzer and a rectifier, an absorber A, an evaporator E and a main condenser C, these parts being connected by various conduits and vessels as will presently be described.

The boiler B is provided with a dome as indicated at 11, and a gas lift pump conduit 12 extends from a point at the lower end of the dome to a point near the top of the gas separation chamber S. For purposes of construction the dome 11 and the gas separating chamber S may be integral consisting merely of a piece of pipe provided with a partition 13.

A conduit 14 is connected to the gas separation chamber S near the lower end thereof and to the top of the absorber A, this conduit serving to convey weak absorption liquids from the gas separation chamber to the absorber.

For conveying refrigerant gas from the gas separation chamber S, a conduit 15 is provided. This conduit passes downwardly from a point near the top of the gas separation chamber S and joins the pipe 16, which is connected to the lower end of the absorber A and conveys absorption liquid from the absorber to the boiler system. At the point of juncture of the conduits 15 and 16 a small vertically extending pipe 17 is provided. The pipe 17 serves as a gas lift pump to convey absorption liquid from the pipe 16 into a small vessel 18 as bubbles of gas enter the conduit 16 through the pipe 15.

In the vessel 18 the gas and liquid separates, the gas passing downwardly through the conduit 20 and entering the standpipe R beneath the baffle plate therein. The vessel 18 is so located that the absorption liquid supplied thereto may flow into the standpipe R through the conduit 21, entering the standpipe R at a point some distance above that at which the conduit 20 enters the standpipe.

As shown in Figure 1 the upper portion of the standpipe R is provided with a number of trays together with associated caps. These are shown in detail in Figures 2 and 3. Each tray consists of a disc 22 provided with a flange 23 adapted to be welded or otherwise secured to the wall of the standpipe R to enable the stacking of the trays one upon the other. The center of each disc 22 is provided with a central opening 24 having a slight flange 25 thereon. A cap 26 is provided for each tray 22. This cap is merely an inverted cup shaped member, the rim of which is provided with the number of teeth which are preferably of approximately the same height as the height of the flange 25 on the disc 22. The teeth are shown in detail in Figure 3 at 27. If desired only a few teeth may be provided, the remainder of the rim being cut away to a height approximately the same as that of the height of the flange 25. In any event the cap should be so arranged as to permit vapors to pass upwardly through the standpipe R, but cause them to come in intimate contact with liquid standing on the traps 22 without any appreciable back pressure being built up.

At a point above the upper tray 22 of the standpipe R a small auxiliary condenser 28 is provided. This may consist merely of a pipe joined to the upper end of the pipe R and provided with one or more reverse bends. Both ends of the auxiliary condenser are connected to the standpipe R the lower connection being provided with a small U-bend as indicated at 29. Any gases passing outwardly through the upper connection of the auxiliary condenser will condense therein and return to the standpipe R and flow downwardly over the baffle plates or trays therein.

The lower end of the standpipe R acts merely as a reservoir for supplying and maintaining a sufficient head of liquid to enable the boiler B and the gas lift pump 12 to operate properly.

In order to prevent surges from adversely effecting the operation of the unit, the lower end of the standpipe R is provided with a partition 30 and a depending tube 31 at a point approximately opposite the point of connection of the outlet conduit 32 which conveys absorption liquid from the standpipe to the boiler B.

As illustrated in Figure 1 the conduit 32 enters the boiler at one side thereof and passes nearly the full length of the boiler before discharging into it. Heat is applied to the boiler B through a tube 33 located in the lower portion thereof and extending parallel to and in close proximity with the supply conduit 32. An electric heater or a gas burner may be located in the tube 33 for this purpose. The absorption liquid entering the boiler through the tube 32 stirs or agitates that already in the vessel and produces an eddy current which prevents the formation of layers of absorption liquid of different concentration in the boiler.

The present invention resides in the above described features in regard to the boiler, rectifier, analyzer assembly. In order to illustrate how the invention may be applied to a refrigerating system, this assembly is shown incorporated in an absorption refrigerating system of the type using an inert gas, although it will be understood that the inventors are not limited to this type of apparatus. In the arrangement shown, the top of the standpipe R is connected to the condenser C in which the refrigerant condenses and is supplied to the evaporator E. The evaporator and absorber are shown as connected by inert gas conduits 35 and 36. A pipe 37 also connects the evaporator to the standpipe R, this pipe being of U-shape to prevent the flow of gases therethrough and being connected to the standpipe R at any convenient point below the lower end of the evaporator, but preferably at a point above some of the trays 22 in the standpipe R, so as to cause the liquid drained from the evaporator to come in contact with the refrigerant gas passing upwardly through the standpipe R.

Assuming that an apparatus is constructed in accordance with the diagram of Figure 1 and that the same is charged with ammonia as refrigerant, water as absorption liquid, hydrogen as inert gas, three cycles of circulation will be set up as follows:

Upon the application of heat to the boiler B through the heating tube 33, refrigerant expelled from the absorption solution in the boiler B will pass upwardly through the gas lift pump conduit 12 to the upper end of the gas separation chamber S, downwardly through the conduit 15, upwardly through the gas lift pump conduit 17, through the chamber or vessel 18, downwardly through the conduit 20, upwardly through the standpipe R coming in intimate contact with liquid on the tray 22 as it does so, and into the condenser C, where it will be liquefied and fed into the evaporator. From the evaporator the refrigerant will flow with the inert gas through the conduit 36 into the absorber where it will be absorbed by the absorption solution and conveyed through the conduits 16, 17 and the vessel 18 and from there through the conduit 21 into the standpipe vessel R where it will now flow downwardly over the lower trays therein, thence through the tube 31 and the conduit 32 back to the boiler.

The absorption liquid will pass through a cycle starting from the boiler B upwardly through the gas lift pump conduit 12 into the gas separation chamber S, thence through the liquid conduit 14 to the top of the absorber and after trickling downwardly over the baffle plates therein, flow back to the boiler through the conduit 16, conduit 17, and the small vessel 18, the conduit 21, the lower portion of the standpipe vessel R, tube 31 and the conduit 32.

At the same time the inert gas will circulate between the evaporator and the absorber, the gas flowing downwardly through the evaporator E, thence through the conduit 36 into the absorber, upwardly through the absorber and back to the evaporator through the conduit 35. If desired this gas circulation may be effected by means of a jet as disclosed in the reissue patent to Altenkirch No. 18,924 granted August 22, 1933, or by any other form of gas circulator, the means employed for inert gas circulation being independent of the present invention. If a jet is used, the conduit which supplies gas to the jet may be connected to the dome 11 of the boiler at a point near the top thereof.

It will be apparent from the description of the apparatus given above that the refrigerant passing from the gas separation chamber S to the condenser C will be effectively deprived of absorption liquid vapor. Some of the absorption liquid vapor will be taken out of the refrigerant gas in the conduit 17 this being the first point where the refrigerant vapor and the absorption liquid come in contact. More absorption liquid vapor will be removed from the refrigerant as the latter passes upwardly in the lower portion of standpipe vessel R, the refrigerant passing in intimate contact with the absorption liquid supplied by the pipes 21 and 37 in traveling over the trays 22 and under the caps 26. The lower portion of the standpipe R thus acts as an analyzer. Absorption liquid vapor will be further removed from the refrigerant gas in the upper part of the standpipe R as it passes upwardly and in contact with liquid supplied to the trays 22 by means of the auxiliary condenser. In this portion of the standpipe R the concentration of the liquid on the trays 22 will be very strong, it being a reflux from the gases which have entered the auxiliary condenser 28.

While Figure 1 illustrates only a diagrammatic construction it will be apparent that the vapor flowing to the main condenser C may be any given part of that passing upwardly through the standpipe R, the ratio being controlled or regulated by the resistance or sizes of the pipes which convey the refrigerant to the main condenser C and to the auxiliary condenser 28.

For best results in rectification and analyzing, the standpipe R should be insulated.

Figure 4 illustrates a modified form of the invention in which the back pressure or resistance to flow of the refrigerant from the boiler to the condenser is reduced in another way. It will be understood that the boiler, analyzer, rectifier, arrangement of Figure 4 may be substituted for the similar arrangement of Figure 1 and the connecting conduits to the other parts of the system are designated the same as in Figure 1.

In the arrangement of Figure 4 a simple construction is provided by welding or otherwise rigidly securing a vertical piece of pipe 40 to a short horizontal section 41. The top of the piece 40 is closed by the end piece 42 and the horizontal section 41 is provided with end pieces 43 and 44. The vertical section 40 is provided with partitions 45 and 46 which divide the composite structure 40—41 into three chambers 47, 48 and 49. The upper chamber 47 is a gas separation chamber, the intermediate chamber 48 may be provided with a number of staggered baffle plates 50 so as to cause it to act as a rectifier and analyzer and, at its lower end, as a reservoir. The lower chamber 49 acts as a boiler being provided with a horizontal extending heating tube 51.

A gas lift pump conduit 52 passes upwardly from the dome shaped portion of the chamber 49 through the chamber 48 and into the upper chamber 47, as indicated.

A conduit 53 extends from the top of the chamber 47 to the chamber 48 at a point below the baffle plates 50. A similar conduit 54 connects the lower portion of the chamber 48 to the boiler chamber 49. The conduit 16 which conveys absorption liquid from the absorber to the boiler system is connected to the chamber 48 at a point so selected as to cause the absorption liquid entering through this conduit to trickle downwardly over a few of the lower baffle plates 50. Conduit 37 which conveys the liquid from the evaporator into the boiler system may be connected to the vessel 48 near the point where the conduit 16 is connected thereto.

The conduit 14 conveys absorption liquid from the boiler rectifier system to the absorber, this conduit being connected to the lower end of the gas separation chamber 42. Refrigerant gas is conveyed away from the boiler rectifier system through the conduit 34, which is connected to the upper end of the chamber 48 and which passes to the condenser.

Assuming that the arrangement of Figure 4 is incorporated into a complete refrigerating system and that heat is applied to the boiler through the tube 51, refrigerant would be expelled from the solution in the boiler 49 and pass upwardly through the gas lift pump conduit 52 into the gas separation chamber 47 and from there pass through the conduit 53 into the chamber 48. After passing upwardly over the baffle plates 50 therein the refrigerant would pass to the condenser through the conduit 34. At the same time the absorption liquid would circulate from the boiler 49 upwardly through the gas lift pump conduit 52 and into the gas separation chamber 47 from which it would pass to the absorber through the liquid conduit 14. Returning from the absorber through the conduit 16 the absorption liquid would trickle downwardly over the lower set of baffle plates 50 in the chamber 48 and from there flow through the conduit 54 back to the boiler.

The lower portion of the chamber 48 does not operate strictly as an analyzer since the process is not adiabatic. Due to the location of the chamber 48 with respect to the boiler some heat will be transferred from the boiler 49 to the lower or reservoir portion of the chamber 48 to aid in the expulsion of refrigerant gas from the solution therein. It may be said, however, that the action on the lower baffle plates 50, that is those beneath the point where the conduit 16 enters the chamber 48, is similar to that of an analyzer while the action on the upper baffle plates 50 is largely that of rectification. It is, of course, within the purview of the invention to provide an auxiliary or reflux condenser like that shown at 28 of Figure 1, near the upper end of the chamber 48 so as to facilitate the separation of the refrigerant from the absorption liquid.

The present application does not include claims on the reflux rectifier, per se, this being the sole invention of Rudolph S. Nelson and is more fully disclosed and claimed in application Serial No. 698,045, filed Nov. 15, 1933.

While only a few embodiments of the invention have been disclosed herein, it is obvious that various changes may be made in the construction and arrangement of parts without departing from the spirit of the invention, or the scope of the annexed claims.

We claim:

1. In an absorption refrigerating system, the combination with an absorber, an evaporator and a device for changing refrigerant from a gaseous phase to a more dense fluid phase, of a boiler connected to said device and consisting of a closed horizontally disposed cylindrical vessel having a dome thereon, a horizontal tube extending through said cylindrical vessel for transmitting heat to fluids therein and a conduit for conveying fluid from said absorber to said vessel, said conduit having a portion located within said vessel above said tube and in proximity therewith.

2. In an absorption refrigerating system, the combination with an absorber, an evaporator and a device for changing refrigerant from a gaseous phase to a more dense fluid phase, of a boiler, rectifier assembly consisting of three separate chambers, two of which are formed in joined pieces of pipe by providing a partition in one of said pieces, said chambers constituting a boiler, a gas separation chamber and a rectifier, means consisting of a pipe of small diameter located entirely within said joined pieces of pipe for acting as a gas lift pump to convey fluids from the boiler to the gas separation chamber and means for conveying gas from the gas separation chamber to the rectifier.

3. In an absorption refrigerating system, the combination with an absorber, an evaporator and a device for changing refrigerant from a gaseous phase to a more dense fluid phase, of a boiler rectifier assembly comprising a vertical piece of pipe integrally connected to a short horizontal piece, partitions in said vertical piece of pipe dividing the composite structure into three chambers one above the other, means for heating the lower chamber to cause it to act as a boiler, a gas lift pump conduit located inside the vertical piece of pipe and passing through said partition for conveying fluids from the boiler to the upper chamber and means for conveying gas from the upper chamber to the intermediate chamber.

4. In an absorption refrigerating system, the combination with an absorber, an evaporator and a device for changing refrigerant from a gaseous phase to a more dense fluid phase, of a boiler rectifier assembly comprising a vertical piece of pipe integrally connected to a short horizontal piece, partitions in said vertical piece of pipe dividing the composite structure into three chambers one above the other, means for heating the lower chamber to cause it to act as a boiler, a gas lift pump conduit located inside the vertical piece of pipe and passing through said partitions for conveying fluids from the boiler to the upper chamber, means for supplying absorption liquid to the boiler through the intermediate chamber and means for conveying gas from the upper chamber through the intermediate chamber in counter flow to the passage of absorption liquid therethrough.

5. In an absorption refrigerating system, the combination with an absorber, an evaporator and a device for changing refrigerant from a gaseous phase to a more dense fluid phase, of a boiler rectifier assembly comprising a horizontal boiler having a dome, a gas separation chamber above the boiler, a gas lift pump conduit connecting the boiler to the gas separation chamber, and a rectifier chamber located below the gas separation chamber, said boiler, rectifier chamber and gas separation chamber being part of an integral structure consisting of a vertical piece of pipe and a short horizontal piece of pipe welded together and partitions in the vertical piece of pipe and said gas lift pump conduit being located in said vertical piece of pipe and passing through said partitions.

6. In an absorption refrigerating system, the combination with an absorber, an evaporator and a device for changing refrigerant from a gaseous phase to a more dense fluid phase, of a boiler-rectifier assembly comprising a boiler, a gas separation chamber located above the boiler, a gas lift pump for conveying fluids from the boiler to the gas separation chamber, a standpipe located alongside the boiler and gas separation chamber and so arranged and connected to the boiler to cause the lower portion of the stand pipe to act as a reservoir, means for conveying a gas from the gas separation chamber to said standpipe, means for causing absorption liquid to flow through a portion of said standpipe to cause said portion to act as an analyzer and means for condensing a portion of the gas passing through the standpipe and returning it to another portion of the standpipe to facilitate separation of the gas from the absorption liquid, said last mentioned portion of the standpipe having trays with flanged openings therein and caps loosely fitted over said openings.

7. In an absorption refrigerating system, the combination with an absorber, an evaporator and a device for changing refrigerant from a gaseous phase to a more dense fluid phase, of a boiler-rectifier assembly comprising a boiler, a gas separation chamber located above the boiler, a gas lift pump for conveying fluids from the boiler to the gas separation chamber, a standpipe located alongside the boiler and gas separation chamber and so arranged and connected to the boiler to cause the lower portion of the standpipe to act as a reservoir, means for conveying a gas from the gas separation chamber to said standpipe, means for causing absorption liquid to flow through a portion of said standpipe to cause said portion to act as an analyzer and means consisting of trays having flanged openings and caps fitted over the openings for bringing the gas and liquid in the standpipe into intimate contact with each other.

8. In an absorption refrigerating system, the combination with an absorber, an evaporator and a device for changing refrigerant from a gaseous phase to a more dense fluid phase, of a boiler-rectifier assembly comprising a boiler, a gas separation chamber located above the boiler, a gas lift pump for conveying fluids from the boiler to the gas separation chamber, a standpipe located alongside the boiler and gas separation chamber and so arranged and connected to the boiler to cause the lower portion of the standpipe to act as a reservoir, means for conveying a gas from the gas separation chamber to said standpipe, means for causing absorption liquid to flow through a portion of said standpipe to cause said portion to act as an analyzer and means for condensing a portion of the gas passing through the standpipe and returning it to another portion of the standpipe to facilitate separation of the gas from the absorption liquid, and means consisting of trays having flanged openings and cooperating caps fitted over said openings for bringing the absorption liquid into intimate contact with the gas and for bringing the reflux from the condensing means into intimate contact with the gas as the gas flows through the standpipe.

9. A continuous absorption refrigerating system comprising a boiler, a gas separation chamber, a standpipe, a condenser, an evaporator, an absorber, means for conveying gas and liquid from the boiler to the gas separation chamber, means for conveying liquid from the gas separation chamber to the absorber, means for bringing refrigerant gas into intimate contact with absorption liquid leaving the absorber and for lifting the absorption liquid to a higher lever than that normally prevailing in the absorber, means for separating the gas from the liquid and for conveying both into the standpipe with the liquid entering the standpipe above the point of entrance of the gas therein, means in the standpipe for again bringing the gas and liquid into intimate contact, means for conveying liquid from the standpipe back to the boiler and means for conveying gas from the standpipe to the condenser.

RUDOLPH S. NELSON.
WALTER C. DAVIDSON.